United States Patent Office 3,532,552
Patented Oct. 6, 1970

3,532,552
CELL WITH PEROXYDISULFATE DEPOLARIZER
Bernard Cohen and Paul R. Mucenieks, Trenton, N.J., assignors to FMC Corporation, New York, N.Y., a corporation of Delaware
Filed Nov. 25, 1968, Ser. No. 778,619
Int. Cl. H01m *17/00, 15/00*
U.S. Cl. 136—100       3 Claims

ABSTRACT OF THE DISCLOSURE

This specification discloses primary electric cells which employ mixtures of peroxydisulfates and phosphates as depolarizers with a zinc or magnesium electrode and an indifferent electrode. The cell may be operated by placing the electrodes directly into a solution of the depolarizer, by adding a conducting liquid to a container which holds the electrodes and the depolarizer in a solid form, or by impregnating a carrier, such as paper or a similar nonmetallic material, with the depolarizer, and wetting the impregnated carrier with a conducting liquid either before or after insertion of the impregnated carrier between the proper electrodes.

CROSS REFERENCE TO RELATED APPLICATIONS

This application is related to application Ser. No. 778,837, "Cell with Peroxydiphosphate Depolarizer," filed on behalf of Bernard Cohen, Paul R. Mucenieks and Leonard R. Darbee, and application Ser. No. 778,738, "Cell with Peroxymonosulfate Depolarizer," filed on behalf of Bernard Cohen and Paul R. Mucenieks, both applications being filed on even date herewith.

BACKGROUND OF THE INVENTION

Field of the invention

Primary electric cells.

Description of the prior art

Peroxydisulfates have been used as depolarizers in primary electric cells (see "Primary Battery Improvements," The Electric Review, 1932, by A. M. Codd). A simple cell was designed and operated; however, many problems were experienced and the work was not pursued. An improvement in this primary cell was disclosed by Blake et al. in U.S. Pat. 2,534,403 in 1950. Blake et al. disclose a primary cell employing a depolarizer composed of a peroxydisulfate and a silver base catalyst for reduction of the persulfate.

One of the major difficulties with primary cells employing peroxydisulfates as a depolarizer is the corrosive action of these compounds on the zinc or magnesium anode material. Ammonium peroxydisulfate is known to attack zine at the rate of 0.01 mm./min. or 0.1 mmoles/$cm.^2$/min. at 25° C. and at approximately twice this rate at 40° C. The attack of magnesium at 25° C. is 0.33 mm./min. or 2.36 mmoles/$cm.^2$/min. The result of this corrosive attack is that primarily heat energy, and not electrical energy, is produced by peroxydisulfate depolarizers.

British Pat. 1,055,472, issued Jan. 18, 1967, disclosed a method of overcoming the electrode corrosion problem encountered when using peroxydisulfate depolarizers. This patent discloses an electric cell, using peroxydisulfate as the depolarizer, in which the anode is separated from the electrolyte by a diaphragm. The diaphragm prevents attack of the anode by the peroxydisulfate so that an electrochemical reaction rather than a chemical reaction occurs. The diaphragm adds materially to the cost and complexity of the cell.

A principal object of this invention is a primary electric cell using a peroxydisulfate depolarizer system that is superior to, and less expensive than, the presently known cells and which can be operated efficiently with or without a cell diaphragm.

SUMMARY OF THE INVENTION

We have now discovered that primary electric cells containing a peroxydisulfate as the depolarizer, with a zinc, zinc-base alloy, magnesium or magnesium-base alloy electrode and an indifferent electrode are improved by including an ionizable phosphate in the depolarizer. The addition of phosphates allows direct contact of the depolarizer solution with the negative electrode without unduly corroding the electrode, and the cells produce predominantly electrical energy rather than heat energy. Orthophosphates, pyrophosphates and peroxydiphosphates are effective phosphate additives, in trace quantities to several percent based on the peroxydisulfate with zinc and zinc alloy electrodes. Orthophosphates and pyrophosphates are not as suitable with magnesium and magnesium alloy electrodes, but peroxydiphosphates are very effective in preventing corrosion of magnesium electrodes. The peroxydiphosphate is used from trace amounts to about 50 percent of the peroxydisulfates but preferably about 2 to 5% is used.

The primary electric cells of this invention employing a mixture of a peroxydisulfate and a phosphate as a depolarizer can be operated without a cell diaphragm. There is no lag in current flow in going from an open to a closed circuit using a magnesium electrode. This is quite surprising as heretofore a significant amount of time elapsed between the time a "magnesium battery" was "turned on" and current began to flow. The depolarizer is used as a solid to which an appropriate conducting liquid is added; the polarizer may be impregnated into a suitable carrier which is subsequently wetted with an appropriate liquid. The system is portable, stable and does not deteriorate on storage when dry. The depolarizers of this invention are not toxic.

DESCRIPTION OF THE INVENTION AND THE PREFERRED EMBODIMENTS

Figure 1:
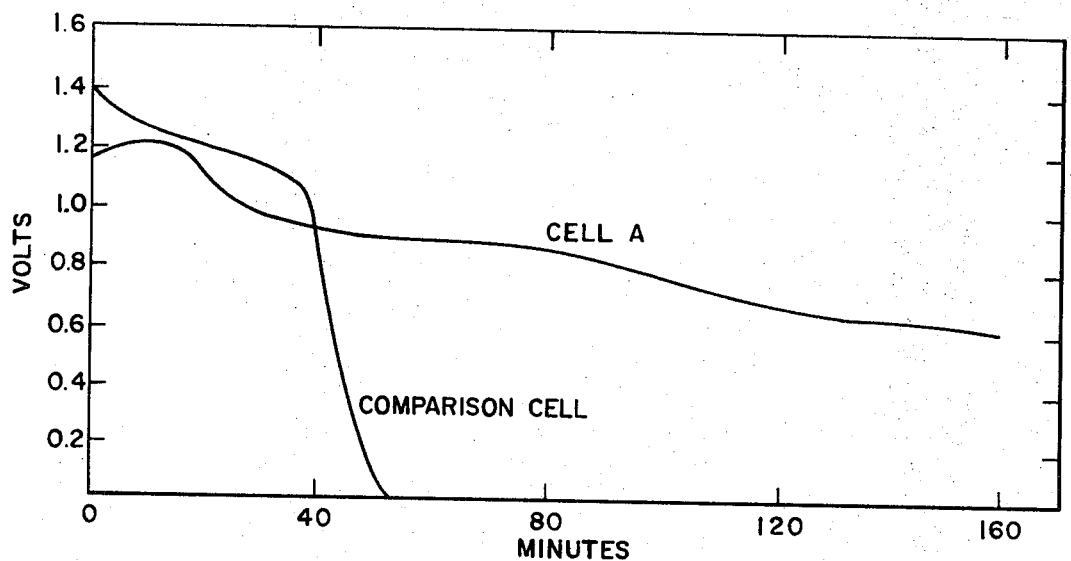
FIG. 1 shows the discharge curves of two primary zinc electric cells; cell A contained a depolarizer solution of the present invention, and the other cell contained a depolarizer solution of the prior art.

Primary electric cells which employ peroxydisulfate as depolarizer, a zinc or a zinc-base alloy electrode and an indifferent electrode are improved when a phosphate is incorporated in the peroxydisulfate depolarizer. Magnesium and magnesium-base alloy cells which employ peroxydisulfate as depolarizer are improved when a peroxydiphosphate is incorporated in the peroxydisulfate depolarizer.

The phosphates useful in practicing this invention are those compounds of phosphorus in the anions of which each atom of phosphorus is surrounded by four oxygen atoms arranged at corners of a tetrahedron. By sharing oxygen atoms between tetrahedra, chains, rings, and branched polymers of interconnected $PO_4$ tetrahedra can be produced. Useful phosphates include but are not limited to orthophosphates, pyrophosphates, perphosphates such as peroxydiphosphates, polymeric phosphates such as tripolyphosphates, and the like.

Orthophosphates, pyrophosphates and peroxydiphosphates in the depolarizer, from trace quantities to several percent, control the corrosion of zinc and zinc-base alloy electrodes. As little as 0.1% phosphate, base on the dry weight of the peroxydisulfate, controls corrosion of the zinc electrodes. The phosphates should not be used with zinc and zinc-base alloy electrodes at levels above about 2 to 3% as apparently phosphatization of the electrodes is so great that electrode reaction is completely halted.

Orthophosphates and pyrophosphates were not found to be as suitable with magnesium electrodes as peroxydiphosphates. Trace amounts of peroxydiphosphates in the peroxydisulfate depolarizers reduce corrosion of the magnesium electrodes. As little as 0.1% peroxydiphosphate based on the dry weight of the peroxydisulfate was found to reduce electrode corrosion and complete control of electrode corrosion was obtained by using about 2–5% peroxydiphosphate, the amount depending somewhat on the metal alloy selected. The peroxydiphosphate can be used up to about 50% of the depolarizer, based on the dry weight of the peroxydisulfate.

Any of the ionizable peroxydisulfates, such as the peroxydisulfates of potassium, sodium, ammonium and lithium may be used in the depolarizer. The peroxydisulfates of the alkali metals, sodium and potassium are preferred as they are satisfactory depolarizers and are readily available.

The depolarizer may be in the form of an intimate mixture of a peroxydisulfate and a phosphate in a finely divided form, or the depolarizer may be impregnated into a carrier such as paper or other nonmetallic material. Primary electric cells, using depolarizers of this invention, may be operated by placing the electrode directly into a solution of the depolarizer, by adding a conducting liquid to a container which holds the electrodes and the depolarizer in a solid form, and by impregnating a carrier such as paper or a similar nonmetallic material and wetting, with a conducting liquid, the carrier either before or after insertion between the proper electrodes. By conducting liquid we mean liquids that conduct, such as electrolytes, and liquids which form a conducting solution when placed in a cell containing a depolarizer.

The indifferent or positive electrode may be carbon, platinum, mild steel and the like. The negative electrode may be magnesium, magnesium-base alloy, zinc or zinc-base alloy. Zinc alloyed with cadmium and lead are known in the art. Magnesium is usually alloyed with aluminum and zinc.

The efficiency of the primary electric cells of this invention are high and the level of the efficiency will be apparent from the examples. The quantities of the materials to be used will depend on the design of the cells and the output required. Many additives, well known in the art of battery making, for improving the operation of primary electric cells, are useful with the depolarizers of this invention. Use of conductivity aids such as acetylene black, carbon black and graphite, binders, oxidation controllers or inhibitors, buffers, catalysts or activation agents, viscosity modifiers, surfactants, rare earths, mercuric chloride and potassium dichromate to improve depolarizers are all known in the art.

The following examples, illustrating the novel products disclosed herein, are given without any intention that the invention be limited thereto. All parts and percentages, unless other wise noted, are by weight.

EXAMPLE 1

A solution containing 4.5 g. of ammonium peroxydisulfate $(NH_4)_2S_2O_8$ and 0.04 g. of sodium pyrophosphate, $Na_4P_2O_7 \cdot 10H_2O$ in 5.5 g. of water was prepared. A comparison solution was prepared, omitting the sodium pyrophosphate (i.e., 4.5 g. of ammonium peroxydisulfate dissolved in 5.5 g. of water).

One milliliter of each solution was placed in different cells, each cell containing a zinc electrode and a carbon electrode. Each electrode had an area of 20 $cm.^2$. The current was drawn from each cell at a constant amperage of 25 ma. (milliamperes). The cell containing the depolarizer solution of this invention yielded 3.5 watt minutes whereas the cell containing the comparison depolarizer solution yielded only 1.3 watt minutes.

FIG. 1 shows the discharge curve for each solution; Cell A is the example of this invention. It is evident that without the phosphate in the depolarizer the useful life and energy output of the cell are greatly reduced. This is due to excessive heat energy rather than electrical energy being produced by this comparison cell.

EXAMPLE 2

Ordinary paper towel was thoroughly wetted in a 50% by weight solution of $(NH_4)_2S_2O_8$, which contained 2% of $K_4P_2O_8$. The impregnated paper was air dried. Pieces of impregnated paper, 1½″ x 3″, when dry, each contained 3 g. of depolarizer mixture. Two sheets of the impregnated papers were wetted and placed between a magnesium electrode and a carbon electrode which were also 1½″ x 3″ by about 1/16″ thick. The cell was pressed tightly together to insure good contact. The cell yielded 2.0 watt minutes. The experiment was repeated and it was found that the output could be maintained constant for 2 hours, after which the output slowly decreased until the $(NH_4)_2S_2O_8$ was consumed.

EXAMPLE 3

Figure 2:
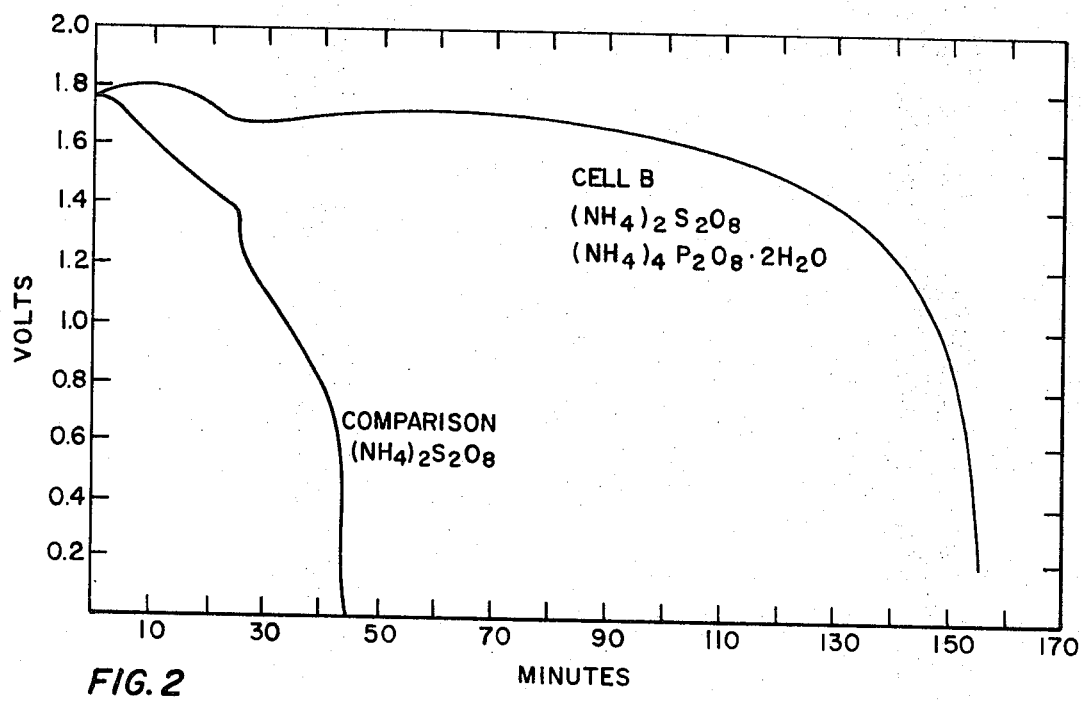
FIG. 2 shows the discharge curve of a magnesium cell containing a depolarizer solution containing ammonium peroxydisulfate, the comparison cell, compared to cell B containing a depolarizer solution of the present invention made from ammonium peroxydisulfate and ammonium peroxydiphosphate.

A solution containing 4.5 g. $(NH_4)_2S_2O_8$, 2 g. $(NH_4)_4P_2O_8 \cdot 2H_2O$ and 7.5 g. $H_2O$ was prepared. One milliliter of the solution was placed between a magnesium electrode and a carbon electrode. Each electrode had an area of 10 $cm.^2$. The current output of the cell was at a constant amperage of 30 ma. The solution in the cell yielded 6.9 watt minutes. A comparison solution was prepared using the same amount of ingredients except the ammonium peroxydiphosphate was deleted. FIG. 2 shows the discharge curve of the cell using a depolarizer solution of this invention, Cell B, and also the comparison discharge curve for the cell that did not contain a peroxydiphosphate in the depolarizer solution.

EXAMPLE 4

Figure 3:
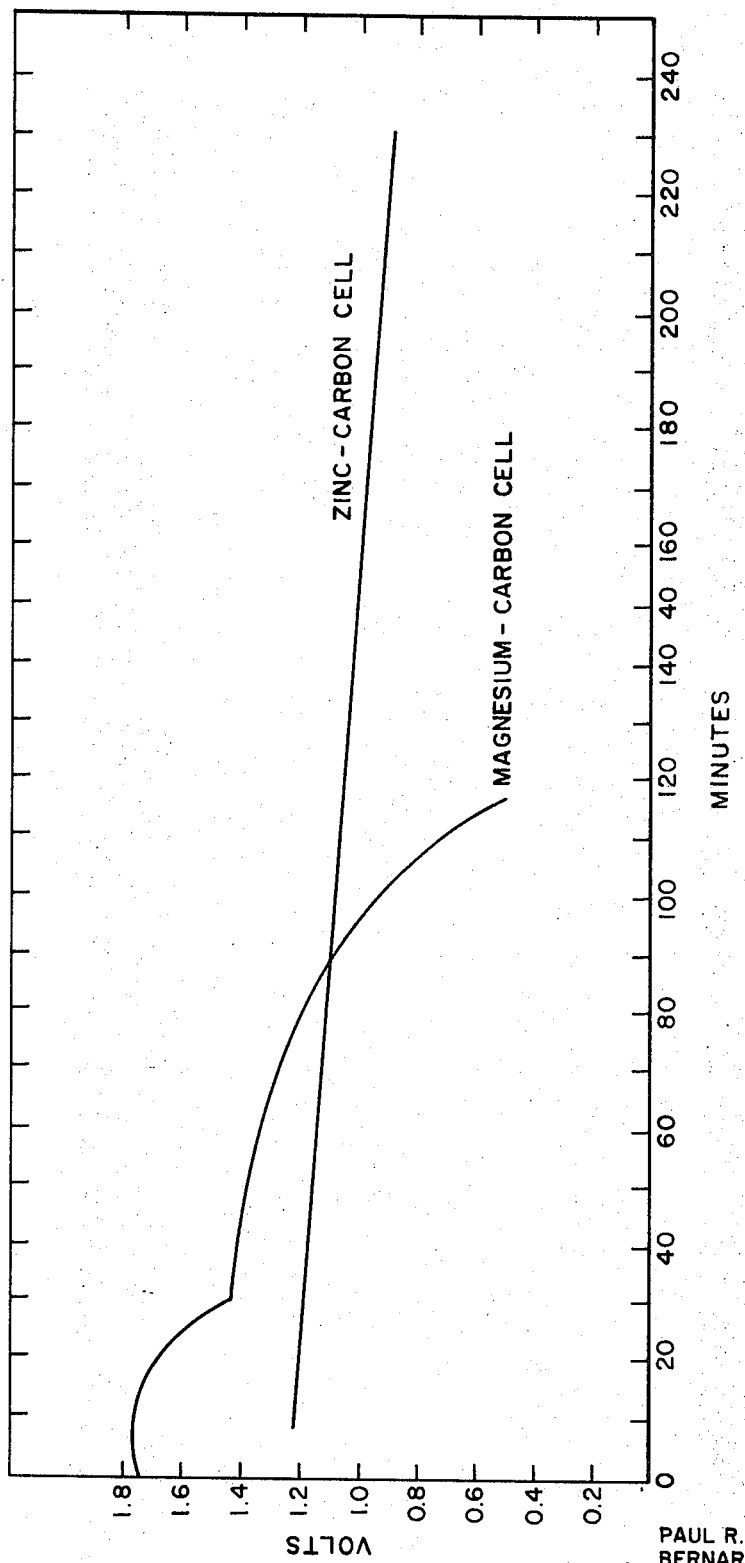
FIG. 3 shows the discharge curves of a cell employing a zinc electrode and a carbon electrode, and a cell employing a magnesium electrode and a carbon electrode; both cells contained depolarizer solutions of the present invention.

A mixture of 4 g. $(NH_4)_2S_2O_8$ and 0.1 g. $Na_3PO_4$ was prepared. 1.5 g. of this mixture was placed in a cell cavity of 4.5 cm. x 4.5 cm. x 1 millimeter thick. Both the negative and positive electrode areas were about 20.25 $cm.^2$. One milliliter of water was added to the cell containing the depolarizer, to activate the cell. Approximately 10 $cm.^2$ of electrode area was used. This experiment was done twice, once employing a zinc electrode and a carbon electrode, and once employing a magnesium electrode and a carbon electrode. The discharge curves of these two cells are shown in FIG. 3.

Obviously, these examples could be multiplied indefinitely, in view of the possible permutations and combinations with modifying additives known in the art, without departing from the scope of the invention.

What is claimed is:

1. In a primary electric cell comprising a negative electrode and a positive electrode in contact with an ionizable peroxydisulfate depolarizer, the improvement which comprises using as depolarizer an ionizable peroxydisulfate together with an ionizable phosphate.

2. The primary electric cell of claim 1 in which the negative electrode is zinc or zinc-base alloy and the depolarizer contains up to 3% by weight of an ionizable phosphate, based on the weight of the peroxydisulfate.

3. The primary electric cell of claim 1 in which the negative electrode is magnesium or magnesium-base alloy and the depolarizer contains up to 50% by weight of an ionizable peroxydiphosphate, based on the weight of the peroxydisulfate.

References Cited

UNITED STATES PATENTS

| | | | |
|---|---|---|---|
| 1,147,753 | 7/1915 | Schatzel | 136—137 XR |
| 1,771,190 | 7/1930 | Polcich | 136—137 |
| 2,534,403 | 12/1950 | Blake et al. | 136—137 XR |
| 2,952,572 | 9/1960 | Johnson | 136—154 |
| 3,444,002 | 5/1969 | Wijnen et al. | 136—137 XR |

FOREIGN PATENTS 1,055,472   1/1967   Great Britain.

WINSTON A. DOUGLAS, Primary Examiner

D. L. WALTON, Assistant Examiner

U.S. Cl. X.R.

136—107, 137